US012643992B2

(12) United States Patent
Wagner et al.

(10) Patent No.: US 12,643,992 B2
(45) Date of Patent: Jun. 2, 2026

(54) HEAT-AGING RESISTANT POLYAMIDE MOLDING COMPOSITIONS

(71) Applicant: BASF SE, Ludwigshafen am Rhein (DE)

(72) Inventors: Sebastian Wagner, Ludwigshafen (DE); Mathias Feil, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 930 days.

(21) Appl. No.: 17/905,068

(22) PCT Filed: Feb. 25, 2021

(86) PCT No.: PCT/EP2021/054677
§ 371 (c)(1),
(2) Date: Aug. 26, 2022

(87) PCT Pub. No.: WO2021/170715
PCT Pub. Date: Sep. 2, 2021

(65) Prior Publication Data

US 2023/0128646 A1 Apr. 27, 2023

(30) Foreign Application Priority Data

Feb. 26, 2020 (EP) .................................... 20159547

(51) Int. Cl.

| | |
|---|---|
| ***C08K 13/04*** | (2006.01) |
| ***C08J 3/20*** | (2006.01) |
| ***C08K 3/04*** | (2006.01) |
| ***C08K 3/08*** | (2006.01) |
| ***C08K 3/16*** | (2006.01) |
| ***C08K 5/06*** | (2006.01) |
| ***C08K 5/13*** | (2006.01) |
| ***C08K 5/20*** | (2006.01) |
| ***C08K 7/14*** | (2006.01) |
| ***C08L 77/02*** | (2006.01) |
| ***C08L 77/06*** | (2006.01) |

(52) U.S. Cl.
CPC ............... *C08K 13/04* (2013.01); *C08J 3/201* (2013.01); *C08K 3/04* (2013.01); *C08L 77/02* (2013.01); *C08L 77/06* (2013.01); *C08J 2377/02* (2013.01); *C08J 2377/06* (2013.01); *C08J 2423/08* (2013.01); *C08J 2477/06* (2013.01); *C08K 2003/0856* (2013.01); *C08K 3/16* (2013.01); *C08K 5/06* (2013.01); *C08K 5/13* (2013.01); *C08K 5/20* (2013.01); *C08K 7/14* (2013.01); *C08L 2201/08* (2013.01); *C08L 2203/12* (2013.01); *C08L 2205/025* (2013.01); *C08L 2205/03* (2013.01)

(58) Field of Classification Search
CPC C08J 2377/02; C08J 2377/06; C08J 2423/08; C08J 2477/06; C08J 3/201; C08K 13/04; C08K 2003/0856; C08K 3/04; C08K 3/16; C08K 5/05; C08K 5/06; C08K 5/13; C08K 5/20; C08K 7/14; C08L 2201/08; C08L 2203/12; C08L 2205/025; C08L 2205/03; C08L 23/0846; C08L 77/02; C08L 77/06; C08L 79/02
See application file for complete search history.

(56) References Cited

U.S. PATENT DOCUMENTS

| | | | |
|---|---|---|---|
| 2,071,250 | A | 2/1937 | Carothers |
| 2,071,251 | A | 2/1937 | Carothers |
| 2,130,523 | A | 9/1938 | Carothers |
| 2,130,948 | A | 9/1938 | Hume |
| 2,241,322 | A | 5/1941 | Hanford |
| 2,312,966 | A | 3/1943 | Hanford |
| 2,512,606 | A | 6/1950 | Bolton et al. |
| 3,354,191 | A | 11/1967 | Stivers |
| 3,393,210 | A | 7/1968 | Speck |

(Continued)

FOREIGN PATENT DOCUMENTS

| | | | |
|---|---|---|---|
| DE | 2537385 | A1 | 2/1977 |
| DE | 2702661 | A1 | 8/1977 |

(Continued)

OTHER PUBLICATIONS

International Search Report and Written Opinion for PCT/EP2021/054677 issued on Jun. 17, 2021, 10 pages.

(Continued)

*Primary Examiner* — Ana L. Woodward
(74) *Attorney, Agent, or Firm* — Armstrong Teasdale LLP

(57) ABSTRACT

Disclosed herein is a thermoplastic molding composition, including:

a) 30 to 99.85 wt % of at least one thermoplastic polyamide as component A;
b) 0.1 to 10 wt % of at least one polyhydric alcohol having more than 6 hydroxyl groups, and having a number average molecular weight $M_n$ of more than 2000 g/mol as component B;
c) 0.05 to 3 wt % of at least one sterically hindered phenol antioxidant as component C;
d) 0 to 3 wt % of at least one polycarboxylic compound having more than 3 carboxylic acid groups and/or carboxylate groups, and having a number average molecular weight $M_n$ of more than 300 g/mol as component D;
e) 0 to 50 wt % of at least one fibrous and/or particulate filler as component E; and
f) 0 to 25 wt % of further additives as component F;

where the total of wt % of components A to F is 100 wt %.

16 Claims, No Drawings

(56) References Cited

U.S. PATENT DOCUMENTS

| | | | |
|---|---|---|---|
| 4,148,846 A | 4/1979 | Owens et al. | |
| 4,360,617 A | 11/1982 | Muller et al. | |
| 4,396,742 A | 8/1983 | Binsack et al. | |
| 4,537,949 A | 8/1985 | Schmidt et al. | |
| 4,540,772 A | 9/1985 | Pipper et al. | |
| 4,771,109 A | 9/1988 | Eichenauer et al. | |
| 4,873,289 A | 10/1989 | Lindner et al. | |
| 4,882,381 A | 11/1989 | Wittmann et al. | |
| 5,010,135 A | 4/1991 | Eckel et al. | |
| 5,326,805 A | 7/1994 | Sicken et al. | |
| 6,013,707 A | 1/2000 | Kleiner et al. | |
| 6,194,538 B1 | 2/2001 | Weiss et al. | |
| 6,255,371 B1 | 7/2001 | Schlosser et al. | |
| 6,365,071 B1 | 4/2002 | Jenewein et al. | |
| 6,699,960 B1 | 3/2004 | Ohlbach et al. | |
| 8,314,202 B2 | 11/2012 | Emrick et al. | |
| 8,445,574 B2 | 5/2013 | Palmer et al. | |
| 2006/0235191 A1 | 10/2006 | Deininger et al. | |
| 2008/0262133 A1* | 10/2008 | Eibeck | C08L 77/00 524/413 |
| 2009/0012229 A1 | 1/2009 | Desbois et al. | |
| 2010/0028580 A1 | 2/2010 | Palmer et al. | |
| 2010/0261818 A1 | 10/2010 | Seki | |
| 2011/0009566 A1 | 1/2011 | Jain et al. | |
| 2012/0157605 A1 | 6/2012 | Eibeck et al. | |
| 2013/0072608 A1 | 3/2013 | Palmer et al. | |
| 2013/0217814 A1 | 8/2013 | Yu | |

FOREIGN PATENT DOCUMENTS

| | | | |
|---|---|---|---|
| DE | 3725576 | A1 | 2/1989 |
| DE | 3800603 | A1 | 7/1989 |
| DE | 4430932 | A1 | 3/1996 |
| DE | 19614424 | A1 | 10/1997 |
| DE | 19960671 | A1 | 9/2000 |
| DE | 19933901 | A1 | 2/2001 |
| DE | 10313681 | A1 | 10/2004 |
| DE | 102004051241 | A1 | 5/2006 |
| DE | 102009011668 | A1 | 9/2009 |
| EP | 0095030 | A1 | 11/1983 |
| EP | 0039524 | B1 | 6/1984 |
| EP | 0038094 | B1 | 7/1984 |
| EP | 0050265 | B1 | 8/1984 |
| EP | 0038582 | B1 | 8/1985 |
| EP | 0047549 | B1 | 6/1987 |
| EP | 0129195 | B1 | 12/1987 |
| EP | 0129196 | B1 | 1/1988 |
| EP | 0208187 | B1 | 11/1990 |
| EP | 0235690 | B1 | 6/1991 |
| EP | 0319290 | B1 | 9/1993 |
| EP | 0299444 | B1 | 6/1994 |
| EP | 0624626 | A1 | 11/1994 |
| EP | 0675914 | A1 | 10/1995 |
| EP | 0584567 | B1 | 1/1998 |
| EP | 0945478 | A1 | 9/1999 |
| EP | 1041109 | A2 | 10/2000 |
| EP | 0922065 | B1 | 11/2002 |
| EP | 1198491 | B1 | 10/2003 |
| EP | 1994075 | B1 | 9/2009 |
| EP | 2100919 | B1 | 3/2011 |
| EP | 2227507 | B1 | 8/2011 |
| EP | 2896656 | A1 | 7/2015 |
| EP | 3059283 | B1 | 10/2018 |
| JP | 2019116607 | A | 7/2019 |
| WO | 2006084862 | A1 | 8/2006 |
| WO | 2006120199 | A1 | 11/2006 |
| WO | 2012106319 | A2 | 8/2012 |

OTHER PUBLICATIONS

Houben-Weyl et al., Methods of Organice Chemistry, 1961, vol. XIV, part 1, 392-406.

Mark et al., Inorganic Polymers, Prentice Hall, 1992, pp. 61 to 141, New Jersey, US.

Wazer et al., Principles of Phosphorus Chemistry. II. Nuclear Magenet Resonance Measurements, J. Am. Chem. Soc., vol. 78, 1956, p. 5715-5726.

* cited by examiner

HEAT-AGING RESISTANT POLYAMIDE MOLDING COMPOSITIONS

CROSS-REFERENCE TO RELATED APPLICATIONS

This application is a U.S. National Phase Application of International Patent Application No. PCT/EP2021/054677, filed Feb. 25, 2021, which claims priority to European Patent Application No. 20159547.7, filed Feb. 26, 2020, each of which is hereby incorporated by reference herein.

The invention relates to thermoplastic molding compositions comprising polyamide which have an improved heat-aging resistance.

The invention further relates to the use of the molding compositions of the invention for producing fibers, foils and moldings of any type, and also to the resultant fibers, foils and moldings.

Furthermore, the invention relates to a mixture comprising a specific combination of heat-aging resistant additives for polyamide molding compositions.

Thermoplastic polyamides, such as PA6 and PA66, are often used in the form of glass fiber-reinforced molding compositions as materials in the design of components which during their lifetime have exposure to elevated temperatures and/or humidity with thermo-oxidative degradation.

Different heat-aging resistant additives which counteract or delay thermo-oxidative degradation are used in polyamide molding compositions, for example a combination of Cu-containing stabilizers, organic HALS (hindered amine light stabilizers) compounds or sterically hindered phenols or polyhydroxy alcohols. It is highly desirable to improve the heat-aging resistance (HAR) of polyamides, since this can achieve longer lifetimes for components subject to thermal stress, or can reduce the risk that these fail. Additionally, improved HAR can also permit the use of the components at higher temperatures.

US 2010/0028580 discloses heat-resistant thermoplastic articles made from a thermoplastic, semiaromatic polyamide composition which includes polyhydric alcohols, such as dipentaerythritol (DPE), sterically hindered phenols, such as Irganox® 1098, Cu heat stabilizers and an ethylene-methacrylic acid copolymer which is zinc-neutralized. By employing these additives, the heat aging performance of the polyamide composition shall be improved.

EP 2 227 507 B1 describes a molding composition with enhanced flow properties and thermal stability using highly branched or hyperbranched polyetheramines.

Additionally, DE 10 2004 051 241 A1 describes a molding composition with improved flow properties and a highly branched or hyperbranched polycarbonate or polyester with a specific OH number measured with KOH.

EP 2 896 656 A1 discloses polyamide resin compositions containing a hydroxyl group- and carboxyl group-containing compound. A preferred compound is 3,5-dihydroxybenzoic acid.

WO 2012/106319 A2 discloses thermoplastic melt-mixed compositions with heat stabilizer additions. The compositions contain for example a copolymer which is a maleic anhydride-modified EPDM, a copper-based stabilizer system including potassium iodide and a low molecular weight additive, for example 2,6-naphtalene dicarboxylic acid. Unfortunately, the given heat aging experiments only cover a time period of 500 h which is not representative for most automotive applications.

EP 1 041 109 A2 discloses a polyamide composition having good fluidity which comprises a polyhydric alcohol having a melting point of 150 to 280° C. which shall improve the fluidity. Examples of the polyhydric alcohols are pentaerythritol, dipentaerythritol and trimethylolethane.

EP 3 059 283 B1 discloses polyamide resin compositions which shall have improved heat-aging resistance at low temperatures. These compositions comprise an aliphatic compound having three or more amino groups or three or more hydroxyl groups per molecule, and a compound having more than one functional group per molecule that is reactive with the amino group or the hydroxyl group. Suitable hydroxyl compounds are trimethylol propane, pentaerythritol or dipentaerythritol among others, see paragraphs [0022] and [0029]. The hydroxyl group-containing aliphatic compound can be reacted for example with compounds having an epoxy group or a glycidyl group.

US 2013/0217814 A1 discloses flame-retardant polyamide compositions, comprising polyamide, halogen-free flame retardant selected from phosphorous compounds, boehmite, a polyhydric alcohol having more than two hydroxyl groups and a number average molecular weight ($M_n$) of about 2000 or less, and at least one reinforcing agent.

The heat-aging resistance of the known molding compositions remains unsatisfactory, in particular over prolonged periods of exposure to heat. In addition, due increasing electrification more and more applications require materials to be free of any halide-based stabilizer systems (e.g. copper iodide) due the risk of corrosion and respective failures. Therefore, none of the compositions disclosed in the quoted literature fulfills a combination of good thermal stability while avoiding the application of the widely used metal-halide stabilizers. Some additives having a low molecular weight like dipentaerythritol have a tendency to migrate out of the moldings at elevated temperatures, leading to impaired mechanical properties over time.

It was therefore an object of the present invention to provide thermoplastic molding compositions comprising polyamides which have improved HAR, and which, after heat-aging, retain good mechanical properties.

The object is achieved by a thermoplastic molding composition, comprising a) 30 to 99.85 wt % of at least one thermoplastic polyamide as component A;
b) 0.1 to 10 wt % of at least one polyhydric alcohol having more than 6 hydroxyl groups, and having a number average molecular weight $M_n$ of more than 2000 g/mol as component B;
c) 0.05 to 3 wt % of at least one sterically hindered phenol antioxidant as component C;
d) 0 to 3 wt % of at least one polycarboxylic compound having more than 3 carboxylic acid groups and/or carboxylate groups, and having a number average molecular weight $M_n$ of more than 300 g/mol as component D;
e) 0 to 50 wt % of at least one fibrous and/or particulate filler as component E;
f) 0 to 25 wt % of further additives as component F;

wherein the total of wt % of components A to F is 100 wt %.

The object is furthermore achieved by a mixture comprising or consisting of b) 0.1 to 10 parts by weight of at least one polyhydric alcohol having more than 6 hydroxyl groups, and having a number average molecular weight Mn of more than 2000 g/mol as component B;

c) 0.05 to 3 parts by weight of at least one sterically hindered phenol antioxidant as component C;

d) 0 to 3 parts by weight of at least one polycarboxylic compound having more than 3 carboxylic acid groups and/or carboxylate groups, and having a number average molecular weight Mn of more than 300 g/mol as component D;

wherein the total of parts by weight of components B to D is 100 parts by weight.

In this mixture, the amounts of components B, C and D listed below as wt % can be employed as parts by weight (e.g. 0.5 wt % becomes 0.5 parts by weight).

The object is furthermore achieved by the use of this mixture for improving the HAR of polyamides, especially after heat-aging.

The object is furthermore achieved by a process for preparing the thermoplastic molding composition as mentioned above by mixing the components A to F.

The object is furthermore achieved by the use of the thermoplastic molding composition for producing fibers, foils and moldings of any type, and by fibers, foils and moldings made of the thermoplastic molding composition as defined above.

According to the present invention, it has been found that a specific combination of at least one polyhydric alcohol having more than six hydroxyl groups and having a number average molecular weight $M_n$ of more than 2000 g/mol with at least one sterically hindered phenol antioxidant and preferably at least one polycarboxylic compound having more than three carboxylic acid or carboxylate groups and having a number average molecular weight $M_n$ of more than 300 g/mol acts as heat stabilizer in thermoplastic polyamide molding compositions, and significantly improves the heat-aging resistance over prolonged periods of exposure to heat.

The number average molecular weight as well as the weight average molecular weight ($M_n$, $M_w$) and polydispersity data can be obtained using gel permeation chromatography (GPC) in hexafluoroisopropanol as solvent with PMMA calibration.

This molecular weight determination can be employed for all components of the thermoplastic molding compositions according to the present invention.

The effect is most pronounced when the polyhydric alcohol component B and polycarboxylic compound of component D have a significantly high number average molecular weight so that they do not migrate from the thermoplastic molding composition under preparation, at molding temperatures and during lifetime of the molded part under elevated service temperature. This effect is most pronounced in thermoplastic molding compositions based on polyamides as the main component.

Furthermore, it is advantageous to employ sterically hindered phenol antioxidants which also have a sufficiently high molecular weight, preferably of more than 500 g/mol and especially a molecular weight above 1000 g/mol. Furthermore, they preferably exhibit a high thermal stability measured by TGA (thermogravimetric analysis) of less than 2% degradation up until 300° C. under nitrogen atmosphere.

The molding compositions of the invention comprise, as component A, from 30 to 99.85 wt %, preferably from 35 to 99.4 wt %, and in particular from 45 to 98.9 wt % of at least one thermoplastic polyamide.

If components D, E or F, or combinations thereof are present in the thermoplastic molding composition, the maximum amount of component A is decreased by the minimum amount of each of components D, E or F, or a combination thereof.

The polyamides of the molding compositions of the invention generally have an intrinsic viscosity of from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, described by way of example in the following U.S. Pat. Nos. 2,071,250, 2,071,251, 2,130,523, 2,130,948, 2,241,322, 2,312,966, 2,512,606, and 3,393,210.

Examples of these are polyamides that derive from lactams having from 7 to 13 ring members, e.g. polycaprolactam, polycaprylolactam, and polylaurolactam, and also polyamides obtained via reaction of dicarboxylic acids with diamines.

Dicarboxylic acids which may be used are alkanedicarboxylic acids having from 6 to 12, in particular from 6 to 10 carbon atoms, and aromatic dicarboxylic acids. Merely as examples, those that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8 carbon atoms, and also m-xylylenediamine, di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Preferred polyamides are polyhexamethyleneadipamide, polyhexamethylenesebacamide, and polycaprolactam, and also nylon-6/6,6 copolyamides, in particular having a proportion of from 5 to 95 wt % of caprolactam units (e.g. Ultramid® C31 from BASF SE).

Other suitable polyamides are obtainable from ω-aminoalkylnitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Particular preference is given to mixtures of nylon-6,6 with other polyamides, in particular blends of nylon-6 and nylon-66, and to nylon-6/6,6 copolyamides and nylon-6,6/6 copolyamides.

Other copolyamides which have proven particularly advantageous are semiaromatic copolyamides, such as PA 6/6T and PA 66/6T, where the triamine content of these is less than 0.5 wt %, preferably less than 0.3 wt % (see EP-A 299 444). Other polyamides resistant to high temperatures are known from EP-A 19 94 075 (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers comprised:

AB Polymers:

- PA 4 Pyrrolidone
- PA 6 ε-Caprolactam
- PA 7 Ethanolactam
- PA 8 Caprylolactam
- PA 9 9-Aminopelargonic acid
- PA 11 11-Aminoundecanoic acid
- PA 12 Laurolactam AA/BB Polymers:

- PA 46 Tetramethylenediamine, adipic acid
- PA 66 Hexamethylenediamine, adipic acid
- PA 69 Hexamethylenediamine, azelaic acid
- PA 610 Hexamethylenediamine, sebacic acid
- PA 612 Hexamethylenediamine, decanedicarboxylic acid
- PA 613 Hexamethylenediamine, undecanedicarboxylic acid
- PA 1212 1,12-Dodecanediamine, decanedicarboxylic acid
- PA 1313 1,13-Diaminotridecane, undecanedicarboxylic acid
- PA 6T Hexamethylenediamine, terephthalic acid
- PA MXD6 m-Xylylenediamine, adipic acid AA/BB Polymers:

- PA 6I Hexamethylenediamine, isophthalic acid
- PA 6-3-T Trimethylhexamethylenediamine, terephthalic acid
- PA 6/6T (see PA 6 and PA 6T)
- PA 6/66 (see PA 6 and PA 66)
- PA 6/12 (see PA 6 and PA 12)
- PA 66/6/610 (see PA 66, PA 6 and PA 610)
- PA 6I/6T (see PA 6I and PA 6T)
- PA PACM 12 Diaminodicyclohexylmethane, laurolactam
- PA 6I/6T/PACM as PA 6I/6T+diaminodicyclohexylmethane
- PA 12/MACMI Laurolactam, dimethyldiaminodicyclohexylmethane, isophthalic acid
- PA 12/MACMT Laurolactam, dimethyldiaminodicyclohexylmethane, terephthalic acid
- PA PDA-T Phenylenediamine, terephthalic acid Most preferred are PA 6, PA 66, PA 6/66 and PA 66/6.

Suitable copolyamides are constructed from:

A1) 20.0 to 90.0 wt % of units derived from terephthalic acid and hexamethylenediamine, A2) 0 to 50.0 wt % of units derived from ε-caprolactam, A3) 0 to 80.0 wt % of units derived from adipic acid and hexamethylenediamine, A4) 0 to 40.0 wt % of further polyamide-forming monomers, wherein the proportion of component A2) or A3) or A4), or mixtures thereof is at least 10.0 wt %.

Component A1) comprises 20.0 to 90.0 wt % of units derived from terephthalic acid and hexamethylenediamine.

In addition to the units derived from terephthalic acid and hexamethylenediamine, the copolyamides optionally comprise units derived from ε-caprolactam and/or units derived from adipic acid and hexamethylenediamine and/or units derived from further polyamide-forming monomers.

Aromatic dicarboxylic acids A4) comprise 8 to 16 carbon atoms. Suitable aromatic dicarboxylic acids include, for example, isophthalic acid, substituted terephthalic and isophthalic acids, such as 3-t-butylisophthalic acid, polycyclic dicarboxylic acids, for example 4,4'- and 3,3'-diphenyldicarboxylic acid, 4,4'- and 3,3'-diphenylmethanedicarboxylic acid, 4,4'- and 3,3'-sulfodiphenylcarboxylic acid, 1,4- or 2,6-naphthalenedicarboxylic acid, phenoxyterephthalic acid, isophthalic acid being particularly preferred.

Further polyamide-forming monomers A4) may be derived from dicarboxylic acids having 4 to 16 carbon atoms and aliphatic or cycloaliphatic diamines having 4 to 16 carbon atoms, and also from aminocarboxylic acids/corresponding lactams having 7 to 12 carbon atoms. Examples of suitable monomers of these types mention are suberic acid, azelaic acid and sebacic acid as representatives of aliphatic dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane or meta-xylylenediamine as representatives of diamines and caprolactam, enantholactam, ω-aminoundecanoic acid and laurolactam as representatives of lactams/aminocarboxylic acids.

Suitable such copolyamides are more particularly elucidated in DE-A-10 2009 011 668.

Component B is employed in an amount of from 0.1 to 10 wt %, preferably 0.5 to 7.5 wt %, in particular 1 to 5 wt %.

Component B is at least one polyhydric alcohol having more than 6 hydroxyl groups, and having a number average molecular weight $M_n$ of more than 2000 g/mol.

Component B preferably has more than 8, more preferably more than 10 hydroxyl groups.

Component B preferably has a number average molecular weight $M_n$ of more than 3000 g/mol, more preferably of more than 5000 g/mol, in particular of more than 10000 g/mol. The maximum number average molecular weight preferably is 35000 g/mol, more preferably 25000 g/mol. A specifically preferred component B has a number average molecular weight of from 10000 to 30000 g/mol, more preferably 12500 to 22500 g/mol, most preferably 15000 to 20000 g/mol.

The weight average $M_w$ is preferably from 10000 to 250000 g/mol, more preferably 25000 to 120000 g/mol, in particular 30000 to 80000 g/mol.

Component B can be selected from all suitable polyhydric alcohols. As long as they have more than 6 hydroxyl groups, and have a number average molecular weight $M_n$ of more than 2000 g/mol.

Examples of suitable polyhydric alcohols are ethylene-vinyl alcohol copolymers are commercially available by Mitsubishi Chemical under the trade name Soarnol™ or by Kuraray under the tradename EVAL™. Other high molecular weight polyhydric alcohols are suitable as well.

Preferably, component B is an ethylene-vinyl alcohol copolymer. Preferably, in the ethylene-vinyl alcohol copolymer, the content of ethylene units is from 10 to 60 mol %, more preferably 20 to 50 mol %, in particular 25 to 50 mol %.

Besides ethylene and vinyl alcohol, residual amounts of vinyl acetate can be present in the copolymer, preferably 20 mol % or less, more preferably 10 mol % or less, in particular 5 mol % or less. Most preferably there are no residual amounts of vinylacetate. The ethylene-vinyl alcohol copolymer can be obtained by partial or complete hydrolysis of ethylene-vinyl acetate copolymers.

An especially suitable ethylene-vinyl alcohol copolymer has a number average molecular weight $M_n$ of from 10000 to 30000 g/mol, more preferably 12500 to 22500 g/mol, most preferably 15000 to 20000 g/mol. Most preferred, it has a number average molecular weight $M_n$ of 18000 g/mol, and a weight average molecular weight $M_w$ of 50000 g/mol.

The polyhydric alcohol can also contain additional functional groups that are not hydroxyl groups. Preferably, however, the polyhydric alcohol contains only hydroxyl groups as functional groups. The polyhydric alcohol can be linear, branched or hyperbranched. Specifically, highly branched or hyper branched structures partially consisting of hydroxy-functional groups as described in e.g. EP 2 227 507

B1 and DE 10 2004 051 241 A1 are also suitable to achieve the desired effect. For example, highly branched or hyperbranched polyetheramines having a hydroxyl number of from 50 to 1000 mg KOH/g, preferably 100 to 900 mg KOH/g, more preferably 150 to 800 mg KOH/g can be employed.

As component C, 0.05 to 3 wt %, preferably 0.1 to 2 wt %, in particular 0.1 to 1 wt % of at least one sterically hindered phenol antioxidant is employed.

Component C preferably has a molecular weight of more than 500 g/mol, more preferably of more than 1000 g/mol.

In one embodiment, the present invention therefore relates to a thermoplastic molding composition, comprising a) 30 to 99.85 wt % of at least one thermoplastic polyamide as component A;
b) 0.1 to 10 wt % of at least one polyhydric alcohol having more than 6 hydroxyl groups, and having a number average molecular weight $M_n$ of more than 2000 g/mol as component B;
c) 0.05 to 3 wt % of at least one sterically hindered phenol antioxidant as component C having a molecular weight of more than 1000 g/mol;
d) 0 to 3 wt % of at least one polycarboxylic compound having more than 3 carboxylic acid groups and/or carboxylate groups, and having a number average molecular weight $M_n$ of more than 300 g/mol as component D;
e) 0 to 50 wt % of at least one fibrous and/or particulate filler as component E;
f) 0 to 25 wt % of further additives as component F;

wherein the total of wt % of components A to F is 100 wt %.

Preferred components A, B, C, D, E and F are described in the present application.

Additionally, component C should preferably exhibit a high thermal stability, e.g. maximum of 5% weight loss, more preferably maximum of 2% weight loss, measured under nitrogen at 300° C. within a TGA (thermogravimetric analysis) experiment (40° C. to 120° C. with 10° C./min, isothermal the later temperature for 15 min followed by 120° C. to 600° C. at 20° C./min).

Component C has preferably at least one, more preferably at least two phenol groups substituted by at least one branched $C_{3-12}$-alkyl group as sterically hindering group. The substituted phenol groups are covalently linked with the structure of component C.

Suitable sterically hindered phenols C are in principle all of the compounds which have a phenolic structure and which have at least one bulky group on the phenolic ring. A bulky group is for example a branched $C_{3-12}$-alkyl group, preferably a branched $C_{3-6}$-alkyl group, more preferably an isopropyl or tert.-butyl group.

It is preferable to use, for example, compounds of the formula

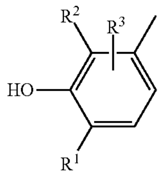

where:

$R^1$ and $R^2$ are an alkyl group, a substituted alkyl group, or a substituted triazole group, and where the radicals $R^1$ and $R^2$ may be identical or different, and $R^3$ is an alkyl group, a substituted alkyl group, an alkoxy group, or a substituted amino group. The alkyl and alkoxy residues have preferably 1 to 12 carbon atoms, more preferably 1 to 6 carbon atoms. Substituents are preferably $C_{1-12}$-alkyl, more preferably $C_{1-6}$-alkyl, most preferably $C_{1-4}$-alkyl. At least one of $R^1$ to $R^3$ is preferably a bulky group as defined above.

Antioxidants of the abovementioned type are described by way of example in DE-A 27 02 661 (U.S. Pat. No. 4,360,617).

Another group of preferred sterically hindered phenols is provided by those derived from substituted phenylcarboxylic acids, in particular from substituted phenylpropionic acids, which preferably have at least one bulky group on the phenyl group. They contain at least one, preferably two covalently linked substituted phenylcarboxylic acid unit(s) in their structure, which preferably have at least one bulky group on the phenyl group.

Preferred phenylcarboxylic acids are phenyl-$C_{1-12}$-carboxylic acids, more preferably phenyl-$C_{2-6}$ carboxylic acids. The phenyl group is preferably a phenol group having at least one bulky group on the phenolic ring, as indicated above. Thus, the above-mentioned sterically hindered phenols are preferably covalently linked with a $C_{1-12}$-alkane carboxylic acid, more preferably a linear $C_{2-6}$-alkane carboxylic acid.

Particularly preferred compounds from this class are compounds of the formula

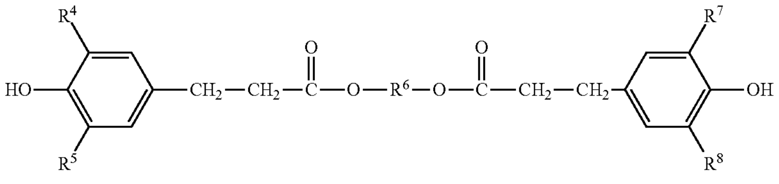

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds. At least one of $R^4$ to $R^8$ is a bulky group as defined above.

Preferred compounds corresponding to these formulae are

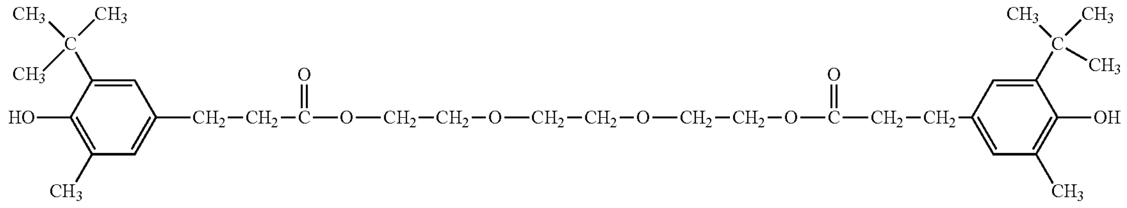 [SMILES: Cc1cc(CCC(=O)OCCOCCOCCOC(=O)CCc2cc(C)c(O)c(C(C)(C)C)c2)cc(C(C)(C)C)c1O]

(Irganox® 245 from BASF SE)

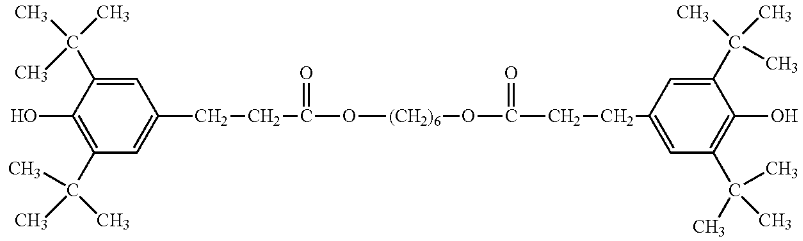

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl) propionate], pentaerythrityl tetrakis[3-(3,5-di-tert-butyl-4-hydroxyphenyl)propionate] (Irganox® 1010 from BASF SE), distearyl 3,5-di-tert-butyl-4-hydroxybenzylphosphonate, 2,6,7-trioxa-1-phosphabicyclo [2.2.2]oct-4-ylmethyl 3,5-di-tert-butyl-4-hydroxyhydrocinnamate, 3,5-ditert-butyl-4-hydroxyphenyl-3,5-distearylthiotriazylamine, 2-(2'-hydroxy-3'-hydroxy-3',5'-di-tertbutylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the products Irganox® 245 and Irganox® 1010 described above from BASF SE, which have particularly good suitability.

In some instances, sterically hindered phenols having not more than one sterically hindered group in ortho-position with respect to the phenolic hydroxy group have proven particularly advantageous; in particular when assessing colorfastness on storage in diffuse light over prolonged periods.

As component D, at least one polycarboxylic compound having more than 3 carboxylic acid and/or carboxylate groups, and having a number average molecular weight $M_n$ of more than 300 g/mol can be employed. The amount of component D is from 0 to 3 wt %, preferably from 0 to 2 wt %, more preferably from 0 to 0.8 wt %.

If present, the amount of component D is from 0.01 to 3 wt %, preferably from 0.1 to 2 wt %, more preferably from 0.2 to 0.8 wt %.

If component D is present, the maximum amount of component A is decreased by the minimum amount of component D. It is therefore decreased by 0.01 wt %, preferably 0.1 wt %, more preferably 0.2 wt %.

The polyamide molding compositions according to the present invention need not contain component D. According to a first embodiment, therefore no component D is contained in the thermoplastic molding composition. However, by additionally employing component D, the heat-aging resistance of the thermoplastic molding composition can be further increased. Therefore, according to a second embodiment of the present invention, the thermoplastic molding composition contains from 0.01 to 3 wt %, preferably from 0.1 to 2 wt %, more preferably from 0.2 to 0.8 wt % of component D. The molding compositions containing component D in these amounts are specifically preferred according to the present invention.

Component D preferably has a number average molecular weight ($M_n$) of more than 500 g/mol, more preferably of more than 1000 g/mol, in particular of more than 2000 g/mol, more particular of more than 3000 g/mol, most particular of more than 2500 g/mol. Most preferably, the weight average molecular weight $M_w$ is in the range of from 4000 to 80000 g/mol, more preferably 15000 to 45000 g/mol.

An essential feature of component D is the presence of more than 3 carboxylic acid groups and/or carboxylate groups in the polycarboxylic compound. The acid function can be present as groups of the free acid or in the form of a salt of the free acid. It is important, that the acid or acid salt functionality is present in the polycarboxylic compound.

Component D preferably has more than 5 carboxylic acid and/or carboxylate groups, more preferably more than 8 carboxylic acid and/or carboxylate groups, most preferably more than 12 carboxylic acid and/or carboxylate groups.

Carboxyl groups preferably are carboxylic acid salt groups. The carboxylic acid groups can therefore be partially or fully neutralized or partially or fully in salt form. Ammonium, alkali metal, alkaline earth metal, iron, copper salts, or mixtures thereof are preferred. Most preferred are alkali metal salts of the carboxylic acid groups. The polycarboxylic compound preferably has partially or fully neutralized carboxylic acid groups, more preferably neutralized with alkali metal cations.

Component D can be selected from a variety of polycarboxylic compounds as long as the minimum number of carboxylic acid and/or carboxylate groups and the minimum number average molecular weight requirements are fulfilled. Possible polycarboxylic compounds of component D are polyacrylic acid or polyacrylates, polymethacrylic acids and polymethacrylates, copolymers containing maleic acid groups, for example polyolefin containing maleic acid groups in the main chain or as graft, for example ethylene-maleic anhydride-copolymers which are neutralized, or polymers which are substituted by a sufficient number of acid or acid salt groups.

Polymers containing the carboxylic acid and/or carboxylate groups can be linear, branched or highly branched. It is also possible to employ polymers which have a sufficient number of carboxylic acid and/or carboxylate end groups. For example, branched or highly branched or hyperbranched polyesters may be mentioned which have the required number of carboxylic acid and/or carboxylate terminal groups.

In the following, polyacrylic acids and polyamines in which the N atoms are partially or polysubstituted with $CH_2CHOOH$ groups are discussed in further detail.

Suitable polycarboxylic compounds are disclosed in the above-mentioned literature, e.g. US 2010/0028580, WO 2012/106319 A2. Examples are polyacrylic acids (CAS: 9004-01-04) including copolymers based on polyacrylic acids of suitable molecular weight and structure. A suitable product is Sokalan® NR 2500 of BASF SE.

Highly branched or hyperbranched structures are suitable as well. Complexing agents based on amino acid structures comprising at least of two or more amino groups and at least four or more carboxylic groups are especially suitable. In all cases it is desirable to apply component D as acid salt for higher thermal stability.

Component D can also be a polymer selected from polyamines, the N atoms being partially or fully substituted with $CH_2COOH$ groups, partially or fully neutralized with alkali metal cations.

The term "polyamine" in the context with component D refers to polymers and copolymers that contain at least one amino group per repeating unit. Said amino group may be selected from $NH_2$ groups, NH groups and preferably tertiary amino groups. In the polymer, tertiary amino groups are preferred since the basic polyamine has been converted to carboxymethyl derivatives, and the N atoms are fully substituted or preferably partially, for example 50 to 95 mol %, preferably 70 to 90 mol %, substituted with $CH_2COOH$ groups, partially or fully neutralized with alkali metal cations. In the context of the present invention, such polymers in which more than 95 mol % to 100 mol % of the N atoms are substituted with $CH_2COOH$ groups will be considered to be fully substituted with $CH_2COOH$ groups. $NH_2$ groups from e.g. polyvinylamines or polyalkyleneimines can be substituted with one or two $CH_2COOH$ group(s) per N atom, preferably with two $CH_2COOH$ groups per N atom.

The numbers of $CH_2COOH$ groups in the polymer divided by the potential total number of $CH_2COOH$ groups, assuming one $CH_2COOH$ group per NH group and two $CH_2COOH$ groups per $NH_2$ group, will also be termed as "degree of substitution" in the context of the present invention.

The degree of substitution can be determined, for example, by determining the amine numbers (amine values) of the polymer and its respective polyamine before conversion to the $CH_2COOH$-substituted polymer, preferably according to ASTM D2074-07.

Examples of polyamines are polyvinylamine, polyalkylenepolyamine and in particular polyalkylenimines, such as polypropylenimines and polyethylenimines.

Within the context of the present invention, polyalkylenepolyamines are preferably understood as meaning those polymers which comprise at least 6 nitrogen atoms and at least 5 $C_2$-$C_{10}$-alkylene units, preferably $C_2$-$C_3$-alkylene units, per molecule, for example pentaethylenhexamine, and in particular polyethylenimines with 6 to 30 ethylene units per molecule. Within the context of the present invention, polyalkylenepolyamines are to be understood as meaning those polymeric materials which are obtained by homo- or copolymerization of one or more cyclic imines, or by grafting a (co)polymer with at least one cyclic imine. Examples are polyvinylamines grafted with ethylenimine and polyimidoamines grafted with ethylenimine.

Preferred polymers are polyalkylenimines, such as polyethylenimines and polypropylenimines, polyethylenimines being preferred. Polyalkylenimines such as polyethylenimines and polypropylenimines can be linear, essentially linear or branched.

In one embodiment of the present invention, polyethylenimines are selected from highly branched polyethylenimines. Highly branched polyethylenimines are characterized by their high degree of branching (DB). The degree of branching can be determined, for example, by $^{13}$C-NMR spectroscopy, preferably in $D_2O$, and is defined as follows:

$$DB=D+T/D+T+L$$

with D (dendritic) corresponding to the fraction of tertiary amino groups, L (linear) corresponding to the fraction of secondary amino groups and T (terminal) corresponding to the fraction of primary amino groups.

Within the context of the present invention, highly branched polyethylenimines are polyethylenimines with DB in the range from 0.25 to 0.90.

In one embodiment of the present invention, polyethylenimine is selected from highly branched polyethylenimines (homopolymers) with an average molecular weight $M_w$ in the range from 600 to 75 000 g/mol, preferably in the range from 800 to 25 000 g/mol.

In another embodiment of the present invention, polyethylenimines are selected from copolymers of ethylenimine, such as copolymers of ethylenimine with at least one diamine with two $NH_2$ groups per molecule other than ethylenimine, for example propylene imine, or with at least one compound with three $NH_2$ groups per molecule such as melamine.

In one embodiment of the present invention, the polymer is selected from branched polyethylenimines, partially or fully substituted with $CH_2COOH$ groups, partially or fully neutralized with $Na^+$.

Within the context of the present invention, the polymer is used in covalently modified form, and specifically such that in total up to at most 100 mol %, preferably in total 50 to 98 mol %, of the nitrogen atoms of the primary and secondary amino groups of the polymer—percentages being based on total N atoms of the primary and secondary amino groups in the polymer—have been reacted with at least one carboxylic acid such as, e.g., Cl—$CH_2COOH$, or at least one equivalent of hydrocyanic acid (or a salt thereof) and one equivalent of formaldehyde. Within the context of the present application, said reaction (modification) can thus be, for example, an alkylation. Most preferably, up to at most 100 mol %, preferably in total 50 to 99 mol %, of the nitrogen atoms of the primary and secondary amino groups of the polymer have been reacted with formaldehyde and hydrocyanic acid (or a salt thereof), for example by way of a Strecker synthesis. Tertiary nitrogen atoms of polyalkylenimine that may form the basis of the polymer are generally not bearing a $CH_2COOH$ group.

The polymer can, for example, have a number average molecular weight ($M_n$) of at least 500 g/mol; preferably, the number average molecular weight of the polymer is in the range from 500 to 1000000 g/mol, particularly preferably 800 to 50000 g/mol, determined determination of the amine numbers (amine values), for example according to ASTM D2074-07, of the respective polyamine before alkylation and after and calculation of the respective number of $CH_2COOH$ groups. The molecular weight refers to the respective per-sodium salt.

Preferably, the $CH_2COOH$ groups of the polymer are partially or fully neutralized with alkali metal cations. The non-neutralized groups COOH can be, for example, the free acid. It is preferred that 90 to 100 mol % of the $CH_2COOH$ groups of the polymer are in neutralized form.

$CH_2COOH$ groups of the polymer may be neutralized, partially or fully, with any type of alkali metal cations, preferably with $K^+$ and particularly preferably with $Na^+$.

Most preferably, component D is based on polyethylenimine which is N-substituted by acetic acid or acetate groups and their respective carboxylic acid salts, preferably alkali metal salts. Thus, polyethylenimine having an amount of branched units in the polymer backbone of 20 to 50%, more preferably 25 to 35%. A suitable product is Trilon® P of BASF SE.

In one embodiment, the present invention therefore relates to a thermoplastic molding composition, comprising a) 30 to 99.85 wt % of at least one thermoplastic polyamide as component A;
b) 0.1 to 10 wt % of at least one polyhydric alcohol having more than 6 hydroxyl groups, and having a number average molecular weight $M_n$ of more than 2000 g/mol as component B;
c) 0.05 to 3 wt % of at least one sterically hindered phenol antioxidant as component C;
d) 0.01 to 3 wt %, preferably 0.1 to 2 wt %, more preferably 0.2 to 0.8 wt % of at least one polycarboxylic compound having more than 3 carboxylic acid groups and/or carboxylate groups, and having a number average molecular weight $M_n$ of more than 300 g/mol, wherein the polycarboxylic compound having more than 3 carboxylic acid groups and/or carboxylate groups is a polyethylenimine which is N-substituted by acetic acid or acetate groups, as component D;
e) 0 to 50 wt % of at least one fibrous and/or particulate filler as component E;
f) 0 to 25 wt % of further additives as component F;

wherein the total of wt % of components A to F is 100 wt %.

Preferred components A, B, C, D, E and F are described in the present application.

As component E, the thermoplastic molding composition contains 0 to 50 wt %, preferably 0 to 45 wt %, more preferably 0 to 40 wt % of at least one fibrous and/or particulate filler.

Preferably, component E comprises glass fibers and is present in an amount of from 10 to 50 wt %, more preferably 15 to 45 wt %, most preferably 20 to 40 wt %.

If component E is present, the maximum amount of component A is decreased by the minimum amount of component E, so that the total amount of components A to F is still 100 wt %.

Fibrous or particulate fillers E that may be mentioned are carbon fibers, glass fibers, glass beads, amorphous silica, calcium silicate, calcium metasilicate, magnesium carbonate, kaolin, chalk, powdered quartz, mica, barium sulfate, and feldspar.

Preferred fibrous fillers that may be mentioned are carbon fibers, aramid fibers, and potassium titanate fibers, particular preference being given to glass fibers in the form of E glass. These can be used as rovings or in the commercially available forms of chopped glass.

The fibrous fillers may have been surface-pretreated with a silane compound to improve compatibility with the thermoplastic.

Suitable silane compounds have the general formula:

$$(X—(CH_2)_n)_k—Si—(O—C_mH_{2m+1})_{4-k}$$

where the definitions of the substituents are as follows:

X $NH_2$—, 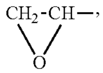 HO—, n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2 wt %, preferably from 0.025 to 1.0 wt % and in particular from 0.05 to 0.5 wt % (based on component E).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior art methods, to give them good compatibility with the organic binder. Addition of the lamellar or acicular nanofillers to the inventive nanocomposites gives a further increase in mechanical strength.

As component F, the molding compositions of the present invention can contain 0 to 25 wt %, preferably 0 to 20 wt %, more preferably 0 to 15 wt % of further additives.

If further additives are employed, the minimum amount is preferably 0.1 wt %, more preferably 0.25 wt %, most preferably 0.5 wt %.

The thermoplastic molding compositions of the invention can comprise as component F conventional processing aids, further stabilizers, oxidation retarders, agents to counteract decomposition by heat and decomposition by ultraviolet light, lubricants and mold-release agents, colorants, such as dyes and pigments, nucleating agents, plasticizers, etc.

The molding compositions of the invention can comprise, as component F1, from 0.05 to 3% by weight, preferably from 0.1 to 1.5% by weight, and in particular from 0.1 to 1% by weight, of a lubricant.

Preference is given to the salts of Al, of alkali metals, or of alkaline earth metals, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component F2, from 0.05 to 3% by weight, preferably from 0.1 to 1.5% by weight, and in particular from 0.1 to 1% by weight, of a copper stabilizer, preferably of a Cu(I) halide, in particular in a mixture with an alkali metal halide, preferably KI, in particular in the ratio 1:4, or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6.

According to a preferred embodiment of the present invention, the molding compositions are free from copper, specifically from copper stabilizers, such as Cu/(I)halides, and combinations of Cu(I)halides with alkali metal halides.

More preferably, the thermoplastic molding compositions of the present inventions are metal halide-free. Metal halide-free systems, so-called electro-friendly systems, are of high interest, since electro-mobility, electrification and connectivity are an increasing trend in almost all industries.

Therefore, the thermoplastic molding composition is preferably free from metal halides, specifically Cu halides and alkali metal halides.

The molding compositions of the invention can comprise from 0.001 to 10 wt %, preferably from 0.05 to 5 wt %, in particular from 0.1 to 2.5 wt % of iron powder having a particle size of at most 10 μm ($d_{50}$ value). The iron powder is preferably obtainable via thermal decomposition of pentacarbonyl iron.

Iron occurs in a number of allotropes:

1. α-Fe (ferrite) forms space-centered cubic lattices, is magnetizable, dissolves a small amount of carbon, and occurs in pure iron up to 928° C. At 770° C. (Curie temperature) it loses its ferromagnetic properties and becomes paramagnetic; iron in the temperature range from 770 to 928° C. is also termed β-Fe. At normal temperature and at a pressure of at least 13 000 M Pa, α-Fe becomes what is known as ε-Fe with a reduction of about 0.20 $cm^3$/mol in volume, whereupon density increases from 7.85 to 9.1 (at 20 000 MPa);
2. γ-Fe (austenite) forms face-centered cubic lattices, is nonmagnetic, dissolves a large amount of carbon, and is observable only in the temperature range from 928 to 1398° C.;
3. δ-Fe, space-centered, exists at from 1398° C. to the melting point of 1539° C.

Metallic iron is generally silver-white, density 7.874 (heavy metal), melting point 1539° C., boiling point 2880° C.; specific heat (from 18 to 100° C.) about 0.5 $g^{-1}$ $K^{-1}$, tensile strength from 220 to 280 $N/mm^2$. The values apply to chemically pure iron.

Industrial production of iron uses smelting of iron ores, iron slags, calcined pyrites, or blast-furnace dust, and resmelting of scrap and alloys.

The iron powder of the invention is produced via thermal decomposition of iron pentacarbonyl, preferably at temperatures of from 150° C. to 350° C. The particles thus obtainable have a preferably spherical shape, therefore being spherical or almost spherical (another term used being spherolitic).

Preferred iron powder has the particle size distribution described below; particle size distribution here is determined by means of laser scattering in very dilute aqueous suspension (e.g. using a Beckmann LS13320). The particle size (and distribution) described hereinafter can optionally be obtained via grinding and/or sieving.

- $d_{xx}$ here means that XX % of the total volume of the particles is smaller than the stated value.
- $d_{50}$ values: at most 10 μm, preferably from 1.6 to 8 μm, in particular from 2.9 to 7.5 μm, very particularly from 3.4 to 5.2 μm
- $d_{10}$ values: preferably from 1 to 5 μm, in particular from 1 to 3 μm, and very particularly from 1.4 to 2.7 μm
- $d_{90}$ values: preferably from 3 to 35 μm, in particular from 3 to 12 μm, and very particularly from 6.4 to 9.2 μm.

The iron powder preferably has iron content of from 97 to 99.8 g/100 g, preferably from 97.5 to 99.6 g/100 g. Content of other metals is preferably below 1000 ppm, in particular below 100 ppm, and very particularly below 10 ppm.

Fe content is usually determined via infrared spectroscopy.

C content is preferably from 0.01 to 1.2 g/100 g, preferably from 0.05 to 1.1 g/100 g, and in particular from 0.4 to 1.1 g/100 g. This C content in the preferred iron powders corresponds to that of powders which are not reduced using hydrogen after the thermal decomposition process.

The carbon content is usually determined by combustion of the sample in a stream of oxygen and then using IR to detect the resultant $CO_2$ gas (by means of a Leco CS230 or CS-mat 6250 from Juwe) by a method based on ASTM E1019.

Nitrogen content is preferably at most 1.5 g/100 g, preferably from 0.01 to 1.2 g/100 g.

Oxygen content is preferably at most 1.3 g/100 g, preferably from 0.3 to 0.65 g/100 g.

N and O are determined via heating of the specimen to about 2100° C. in a graphite furnace. The oxygen obtained from the specimen here is converted to CO and measured by way of an IR detector. The N liberated under the reaction conditions from the N-containing compounds is discharged with the carrier gas and detected and recorded by means of TCD (Thermal Conductivity Detector) (both methods based on ASTM E1019).

Tap density is preferably from 2.5 to 5 $g/cm^3$, in particular from 2.7 to 4.4 $g/cm^3$. This generally means the density when the powder is, for example, charged to the container and compacted by vibration. Iron powders to which further preference is given can have been surface-coated with iron phosphate, with iron phosphite, or with $SiO_2$.

BET surface area to DIN ISO 9277 is preferably from 0.1 to 10 $m^2/g$, in particular from 0.1 to 5 $m^2/g$, and preferably from 0.2 to 1 $m^2/g$, and in particular from 0.4 to 1 $m^2/g$.

In order to achieve particularly good dispersion of the iron particles, a masterbatch may be used, involving a polymer. Suitable polymers for this purpose are polyolefins, polyesters, or polyamides, and it is preferable here that the masterbatch polymer is the same as component A. The mass fraction of the iron in the polymer is generally from 15 to 80 wt %, preferably from 20 to 40 wt %.

The elastomeric polymers are different from component D if component D is employed in the molding compositions according to the present invention. Therefore, in the case that the compositions contain component D, the polymers of component F, especially the elastomeric polymers, are different from the polymers of component D.

Likewise, the polymers of components F are different from the polymers of component B.

Examples of other conventional additives F are amounts of up to 25 wt %, preferably up to 20 wt % of elastomeric polymers (also often termed impact modifiers, elastomers, or rubbers).

These are very generally copolymers preferably composed of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, vol. 14/1 (Georg-Thieme-Verlag, Stuttgart, Germany, 1961), pages 392 to 406, and in the monograph by C. B. Bucknall, Toughened Plastics (Applied Science Publishers, London, U K, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricycledienes, such as 3-methyltricyclo[5.2.1.$0^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50 wt %, in particular from 1 to 8 wt %, based on the total weight of the rubber.

EPM rubbers and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These dicarboxylic acid derivatives or monomers comprising epoxy groups are preferably incorporated into the rubber by adding to the monomer mixture monomers comprising dicarboxylic acid groups and/or epoxy groups and having the general formulae I or II or III or IV (I)

$$R^1C(COOR^2){=}C(COOR^3)R^4$$

(II)

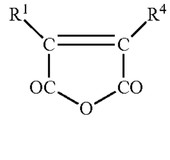

-continued (III)

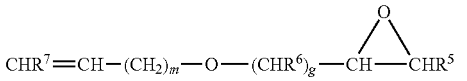

(IV)

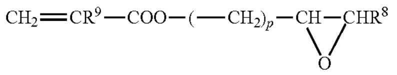

where $R^1$ to $R^9$ are hydrogen or alkyl groups having from 1 to 6 carbon atoms, and m is a whole number from 0 to 20, g is a whole number from 0 to 10 and p is a whole number from 0 to 5.

The radicals $R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98 wt % of ethylene, from 0.1 to 20 wt % of monomers comprising epoxy groups and/or methacrylic acid and/or monomers comprising anhydride groups, the remaining amount being (meth)acrylates.

Particular preference is given to copolymers composed of
- from 50 to 98 wt %, in particular from 55 to 95 wt % of ethylene,
- from 0.1 to 40 wt %, in particular from 0.3 to 20 wt % of glycidyl acrylate and/or glycidyl methacrylate, (meth) acrylic acid and/or maleic anhydride, and
- from 1 to 45 wt %, in particular from 5 to 40 wt % of n-butyl acrylate and/or 2-ethylhexyl acrylate.

Other preferred (meth)acrylates are the methyl, ethyl, propyl, isobutyl and tert-butyl esters.

Comonomers which may be used alongside these are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as, for example, n-butyl acrylate and 2-ethylhexyl acrylate, corresponding methacrylates, butadiene and isoprene, and also mixtures of these.

These monomers may be copolymerized with other monomers, such as, for example, styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

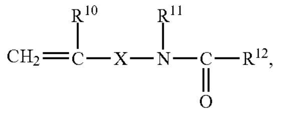

where the substituents can be defined as follows:
- $R^{10}$ is hydrogen or a $C_1$-$C_4$-alkyl group,
- $R^{11}$ is hydrogen, a $C_1$-$C_8$-alkyl group or an aryl group, in particular phenyl,
- $R^{12}$ is hydrogen, a $C_1$-$C_{10}$-alkyl group, a $C_6$-$C_{12}$-aryl group, or —$OR^{13}$,
- $R^{13}$ is a $C_1$-$C_8$-alkyl group or a $C_6$-$C_{12}$-aryl group, which can optionally have substitution by groups that comprise O or by groups that comprise N,
- X is a chemical bond, a $C_1$-$C_{10}$-alkylene group, or a $C_6$-$C_{12}$-arylene group, or

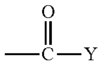

- Y is O—Z or NH—Z, and
- Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graftlinking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5 wt %, preferably not more than 3 wt %, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl meth-acrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate/glycidyl acrylate or n-butyl acrylate/glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

UV stabilizers that may be mentioned, the amounts of which used are generally up to 2 wt %, based on the molding composition, are various substituted resorcinols, salicylates, benzotriazoles, and benzophenones.

Materials that can be added as colorants are inorganic pigments, such as titanium dioxide, ultramarine blue, iron oxide, and carbon black, and also organic pigments, such as phthalocyanines, quinacridones, perylenes, and also dyes, such as anthraquinones.

Materials that can be used as nucleating agents are sodium phenylphosphinate, aluminum oxide, silicon dioxide, and also preferably talc.

The thermoplastic molding compositions can furthermore contain flame retardants as component F.

As component F, the thermoplastic molding materials can comprise 1.0 to 10.0 wt %, preferably 2.0 to 6.0 wt %, in particular 3.0 to 5.0 wt %, of at least one phosphazene of general formula (IX) or (X) as flame retardant.

The minimum amount of component F is at least 1.0 wt %, preferably 2.0 wt %, in particular 3.0 wt %.

The maximum amount of component F is 10.0 wt %, preferably 6.0 wt %, particularly preferably 5.0 wt %.

"Phosphazenes" is to be understood as meaning cyclic phosphazenes of general formula (IX)

(IX)

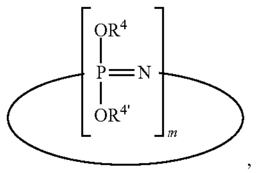

in which m is an integer from 3 to 25 and $R^4$ and $R^{4'}$ are identical or different and represent $C_1$-$C_{20}$-alkyl-, $C_6$-$C_{30}$-aryl-, $C_6$-$C_{30}$-arylalkyl- or $C_6$-$C_{30}$-alkyl-substituted aryl or linear phosphazenes of general formula (X)

(X)

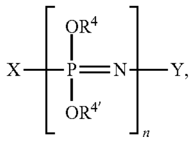

in which n represents 3 to 1000 and X represents —N═P$(OPh)_3$ or —N═P(O)OPh and Y represents —$P(OPh)_4$ or —$P(O)(OPh)_2$.

The production of such phosphazenes is described in EP-A 0 945 478.

Particular preference is given to cyclic phenoxyphosphazenes of formula $P_3N_3C_{36}$ of formula (XI)

(XI)

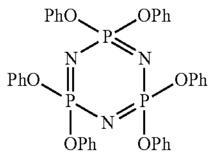

or linear phenoxyphosphazenes according to formula (XII)

(XII)

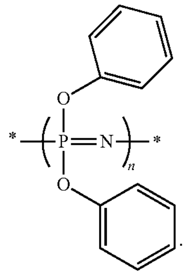

The phenyl radicals may optionally be substituted. Phosphazenes in the context of the present application are described in Mark, J. E., Allcock, H. R., West, R., Inorganic Polymers, Prentice Hall, 1992, pages 61 to 141.

Preferably employed as component F are cyclic phenoxyphosphazenes having at least three phenoxyphosphazene units. Corresponding phenoxyphosphazenes are described for example in US 2010/0261818 in paragraphs [0051] to [0053]. Reference may in particular be made to formula (I) therein. Corresponding cyclic phenoxyphosphazenes are furthermore described in EP-A-2 100 919, in particular in paragraphs [0034] to [0038] therein. Production may be effected as described in EP-A-2 100 919 in paragraph [0041]. In one embodiment of the invention the phenyl groups in the cyclic phenoxyphosphazene may be substituted by $C_{1-4}$-alkyl radicals. It is preferable when pure phenyl radicals are concerned.

For further description of the cyclic phosphazenes reference may be made to Römpp Chemie Lexikon, 9th ed., keyword "phosphazenes". Production is effected for example via cyclophosphazene which is obtainable from $PCl_5$ and $NH_4Cl$, wherein the chlorine groups in the cyclophosphazene have been replaced by phenoxy groups by reaction with phenol.

The cyclic phenoxy phosphazene compound may for example be produced as described in Allcock, H. R., Phosphorus-Nitrogen Compounds (Academic Press, 1972), and in Mark, J. E., Allcock, H. R., West, R., Inorganic Polymers (Prentice Hall, 1992).

Component F is preferably a mixture of cyclic phenoxyphosphazenes having three and four phenoxy phosphazene units. The weight ratio of rings comprising three phenoxyphosphazene units to rings comprising four phenoxyphosphazene units is preferably about 80:20. Larger rings of the phenoxyphosphazene units may likewise be present but in smaller amounts. Suitable cyclic phenoxyphosphazenes are obtainable from Fushimi Pharmaceutical Co., Ltd., under the name Rabitle® FP-100. This is a matt-white/yellowish solid having a melting point of 110° C., a phosphorus content of 13.4% and a nitrogen content of 6.0%. The proportion of rings comprising three phenoxyphosphazene units is at least 80.0 wt %.

The thermoplastic molding materials preferably comprise 1.0 to 6.0 wt %, preferably 2.5 to 5.5 wt %, in particular 3.0 to 5.0 wt % of at least one aliphatic or aromatic ester of phosphoric acid or polyphosphoric acid as flame retardant.

For this reason especially solid, non-migrating phosphate esters having a melting point between 70° C. and 150° C. are preferred. This has the result that the products are easy to meter and exhibit markedly less migration in the molding material. Particularly preferred examples are the commercially available phosphate esters PX-200 (CAS: 139189-30-3) from Daihachi, or Sol-DP from ICL-IP. Further phosphate esters with appropriate substitution of the phenyl groups are conceivable when this allows the preferred melting range to be achieved. The general structural formula, depending on the substitution pattern in the ortho position or the para position on the aromatic ring, is as follows:

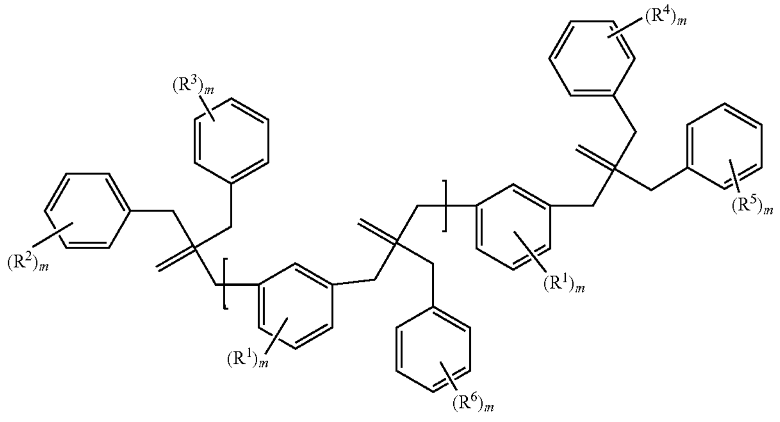

or

-continued

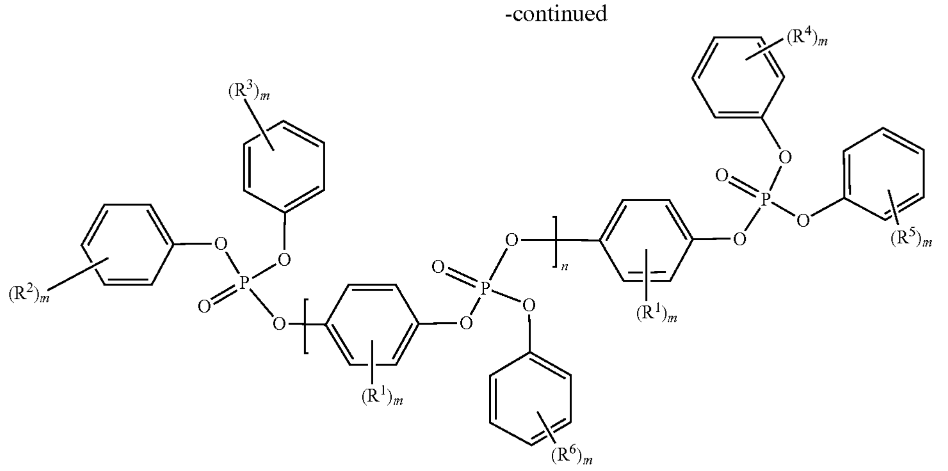

or

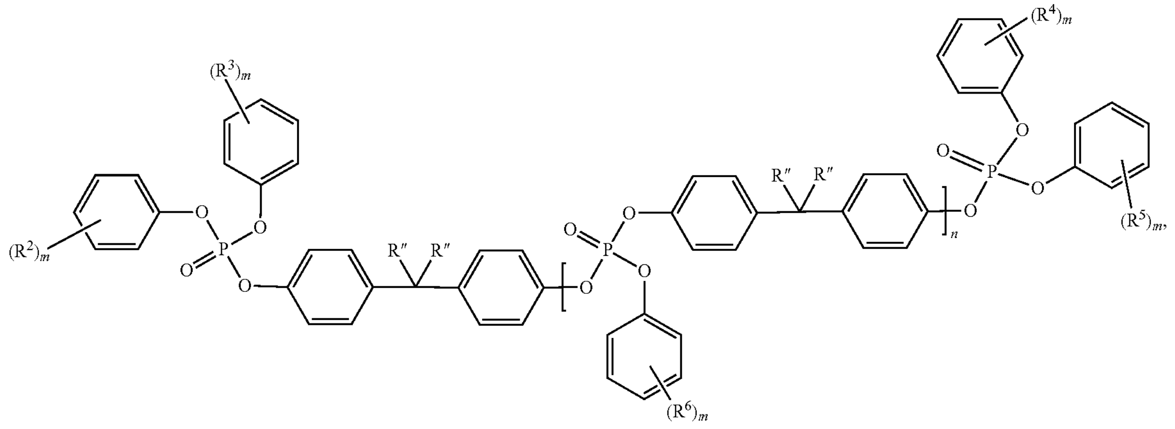

wherein $R^1$=H, methyl, ethyl or isopropyl, but preferably H.

n=between 0 and 7, but preferably 0.

$R^{2-6}$=H, methyl, ethyl or isopropyl, but preferably methyl. $R^6$ is preferably identical to $R^4$ and $R^5$.

m=may be, but needs not be identical and is between 1, 2, 3, 4 and 5, but preferably 2.

R"=may be H, methyl, ethyl or cyclopropyl, but preferably methyl and H.

PX-200 is given as a concrete example:

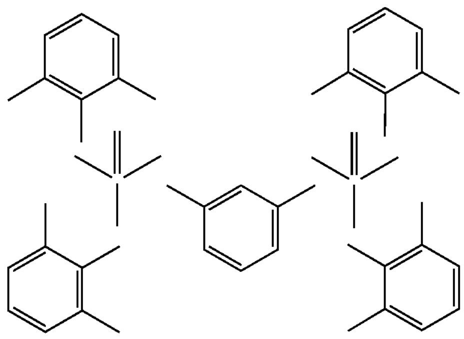

It is particularly preferable when at least one aromatic ester of polyphosphoric acid is employed. Such aromatic polyphosphates are obtainable for example from Daihachi Chemical under the name PX-200.

As component F, the thermoplastic molding materials according to the invention can comprise 5.0 to 30.0 wt %, preferably 10.0 to 25.0 wt %, in particular 12.0 to 20.0 wt %, for example about 16.0 wt %, of at least one metal phosphinate or phosphinic acid salt described hereinbelow as flame retardant.

The minimum amount of component D is 5.0 wt %, preferably 10.0 wt %, in particular 12.0 wt %.

The maximum amount of component F is 30.0 wt %, preferably 25.0 wt %, particularly preferably 20.0 wt %.

Examples of preferred flame retardants of component F are metal phosphinates derived from hypophosphorous acid. A metal salt of hypophosphorous acid with Mg, Ca, Al or Zn as the metal may be employed for example. Particular preference is given here to aluminum hypophosphite.

Also suitable are phosphinic acid salts of formula (I) or/and diphosphinic acid salts of formula (II) or polymers thereof

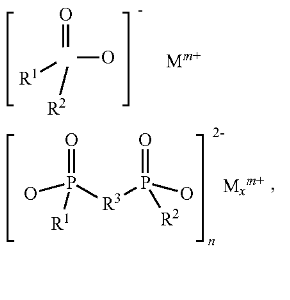

in which $R^1$, $R^2$ are identical or different and represent hydrogen, $C_1$-$C_6$-alkyl, linear or branched, and/or aryl;

$R^3$ represents $C_1$-$C_{10}$-alkylene, linear or branched, $C_6$-$C_{10}$-arylene, -alkylarylene or -arylalkylene;

M represents Mg, Ca, Al, Sb, Sn, Ge, Ti, Zn, Fe, Zr, Ce, Bi, Sr, Mn, Li, Na, K and/or a protonated nitrogen base;

m=1 to 4; n=1 to 4; x=1 to 4, preferably m=3, x=3.

Preferably, $R^1$, $R^2$ are identical or different and represent hydrogen, methyl, ethyl, n-propyl, isopropyl, n-butyl, tert.-butyl, n-pentyl and/or phenyl.

Preferably, $R^3$ represents methylene, ethylene, n-propylene, isopropylene, n-butylene, tert-butylene, n-pentylene, n-octylene or n-dodecylene, phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

Particularly preferably, $R^1$, $R^2$ are hydrogen, methyl, ethyl, and M is Al, particular preference is given to Al hypophosphite.

Production of the phosphinates is preferably effected by precipitation of the corresponding metal salts from aqueous solutions. However, the phosphinates may also be precipitated in the presence of a suitable inorganic metal oxide or sulfide as support material (white pigments, for example $TiO_2$, $SnO_2$, ZnO, ZnS, $SiO_2$). This accordingly affords surface-modified pigments which can be employed as laser-markable flame retardants for thermoplastic polyesters.

It is preferable when metal salts of substituted phosphinic acids are employed in which compared to hypophosphorous acid one or two hydrogen atoms have been replaced by phenyl, methyl, ethyl, propyl, isobutyl, isooctyl or radicals R'—CH—OH have been replaced by R'-hydrogen, phenyl, tolyl. The metal is preferably Mg, Ca, Al, Zn, Ti, Fe. Aluminum diethylphosphinate (DE-PAL) is particularly preferred.

For a description of phosphinic acid salts or diphosphinic acid salts reference may be made to DE-A 199 60 671 and also to DE-A 44 30 932 and DE-A 199 33 901.

Further flame retardants are, for example, halogen-containing flame retardants.

Suitable halogen-containing flame retardants are preferably brominated compounds, such as brominated diphenyl ether, brominated trimethylphenylindane (FR 1808 from DSB) tetrabromobisphenol A and hexabromocyclododecane.

Suitable flame retardants are preferably brominated compounds, such as brominated oligocarbonates (BC 52 or BC 58 from Great Lakes), having the structural formula:

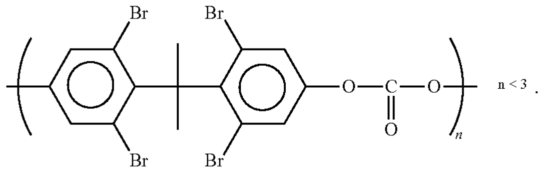

Especially suitable are polypentabromobenzyl acrylates, where n>4 (e.g. FR 1025 from ICL-IP having the formula:

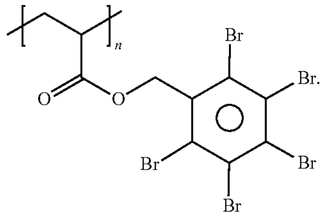

Preferred brominated compounds further include oligomeric reaction products (n>3) of tetrabromobisphenol A with epoxides (e.g. FR 2300 and 2400 from DSB) having the formula:

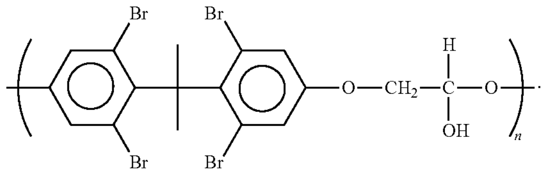

The brominated oligostyrenes preferably employed as flame retardants have an average degree of polymerization (number-average) between 3 and 90, preferably between 5 and 60, measured by vapor pressure osmometry in toluene. Cyclic oligomers are likewise suitable. In a preferred embodiment of the invention the brominated oligomeric styrenes have the formula I shown below in which R represents hydrogen or an aliphatic radical, in particular an alkyl radical, for example $CH_2$ or $C_2H_5$, and n represents the number of repeating chain building blocks. $R^1$ may be H or else bromine or else a fragment of a customary free radical former:

(I)

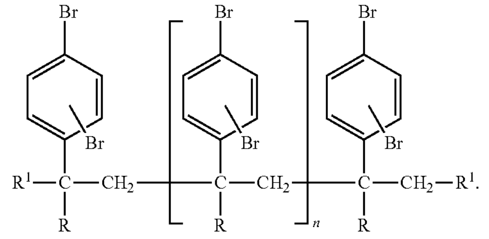

The value n may be 1 to 88, preferably 3 to 58. The brominated oligostyrenes comprise 40.0 to 80.0 wt %, preferably 55.0 to 70.0 wt %, of bromine. Preference is given to a product consisting predominantly of polydibromostyrene. The substances are meltable without decomposing, and soluble in tetrahydrofuran for example. Said substances may be produced either by ring bromination of—optionally aliphatically hydrogenated—styrene oligomers such as are obtained for example by thermal polymerization of styrene (according to DT-OS 25 37 385) or by free-radical oligomerization of suitable brominated styrenes. The production of the flame retardant may also be effected by ionic oligomerization of styrene and subsequent bromination. The amount of brominated oligostyrene necessary for endowing the polyamides with flame retardant properties depends on the bromine content. The bromine content in the molding materials according to the invention is from 2.0 to 30.0 wt %, preferably from 5.0 to 12.0 wt %.

The brominated polystyrenes according to the invention are typically obtained by the process described in EP-A 047 549:

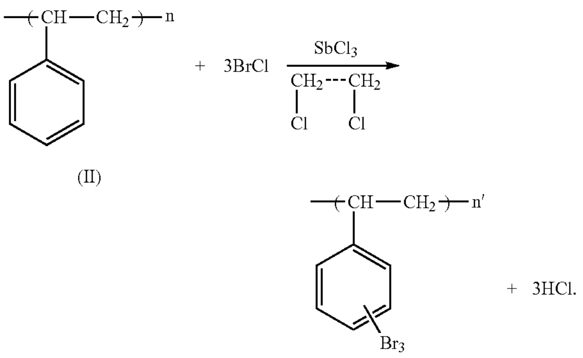

(II)

(III)

The brominated polystyrenes obtainable by this process and commercially available are predominantly ring-substituted tribrominated products. n' (see III) generally has values of 125 to 1500 which corresponds to a molecular weight of 42500 to 235000, preferably of 130000 to 135000.

The bromine content (based on the content of ring-substituted bromine) is generally at least 50.0 wt %, preferably at least 60.0 wt % and in particular 65.0 wt %.

The commercially available pulverulent products generally have a glass transition temperature of 160° C. to 200° C. and are for example obtainable under the names SAYTEX® HP-7010 from Albemarle and Pyrocheck® PB 68 from Ferro Corporation.

Mixtures of the brominated oligostyrenes with brominated polystyrenes may also be employed in the molding materials according to the invention, the mixing ratio being freely choosable.

Also suitable are chlorine-containing flame retardants, Declorane Plus® from OxyChem being preferable.

Suitable halogen-containing flame retardants are preferably ring-brominated polystyrene, brominated polybenzyl acrylates, brominated bisphenol A epoxide oligomers or brominated bisphenol A polycarbonates.

In one embodiment of the invention no halogen-containing flame retardants are employed in the thermoplastic molding materials according to the invention.

A flame retardant melamine compound suitable as component F in the context of the present invention is a melamine compound which when added to glass fiber filled polyamide molding materials reduces flammability and influences fire behavior in a fire retarding fashion, thus resulting in improved properties in the UL 94 tests and in the glow wire test.

The melamine compound is for example selected from melamine borate, melamine phosphate, melamine sulfate, melamine pyrophosphate, melam, melem, melon or melamine cyanurate or mixtures thereof.

The melamine cyanurate preferentially suitable according to the invention is a reaction product of preferably equimolar amounts of melamine (formula I) and cyanuric acid/isocyanuric acid (formulae Ia and Ib).

(I)

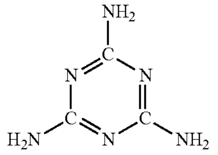

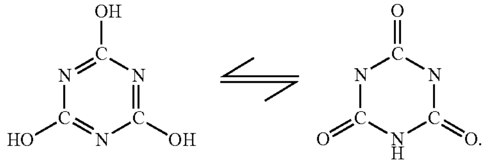

(Ia)
Enol form (Ib)
Keto form

It is obtained for example by reaction of aqueous solutions of the starting compounds at 90° C. to 100° C. The commercially available product is a white powder having an average grain size $d_{50}$ of 1.5 to 7 μm and a $d_{99}$ value of less than 50 μm.

Further suitable compounds (often also described as salts or adducts) are melamine sulfate, melamine, melamine borate, oxalate, phosphate prim., phosphate sec. and pyrophosphate sec., melamine neopentyl glycol borate. According to the invention the molding materials are preferably free from polymeric melamine phosphate (CAS no. 56386-64-2 or 218768-84-4).

This is to be understood as meaning melamine polyphosphate salts of a 1,3,5-triazine compound which have an average degree of condensation number n between 20 and 200 and a 1,3,5-triazine content of 1.1 to 2.0 mol of a 1,3,5-triazine compound selected from the group consisting of melamine, melam, melem, melon, ammeline, ammelide, 2-ureidomelamine, acetoguanamine, benzoguanamine and diaminophenyltriazine per mole of phosphorus atom. Preferably, the n-value of such salts is generally between 40 and 150 and the ratio of a 1,3,5-triazine compound per mole of phosphorus atom is preferably between 1.2 and 1.8. Furthermore, the pH of a 10 wt % aqueous slurry of salts produced according to EP-B1 095 030 will generally be more than 4.5 and preferably at least 5.0. The pH is typically determined by adding 25 g of the salt and 225 g of clean water at 25° C. into a 300 ml beaker, stirring the resultant aqueous slurry for 30 minutes and then measuring the pH. The abovementioned n-value, the number-average degree of condensation, may be determined by means of 31P solid-state NMR. J. R. van Wazer, C. F. Callis, J. Shoolery and R. Jones, J. Am. Chem. Soc., 78, 5715, 1956 discloses that the number of adjacent phosphate groups gives a unique chemical shift which permits clear distinction between orthophosphates, pyrophosphates, and polyphosphates.

Suitable guanidine salts are

| | CAS no. |
|---|---|
| g carbonate | 593-85-1 |
| g cyanurate prim. | 70285-19-7 |
| g phosphate prim. | 5423-22-3 |
| g phosphate sec. | 5423-23-4 |
| g sulfate prim. | 646-34-4 |
| g sulfate sec. | 594-14-9 |
| guanidine pentaerythritol borate | n.a. |
| guanidine neopentyl glycol borate | n.a. |
| and urea phosphate green | 4861-19-2 |

-continued

| Suitable guanidine salts are | |
|---|---|
| | CAS no. |
| urea cyanurate | 57517-11-0 |
| ammeline | 645-92-1 |
| ammelide | 645-93-2 |
| melem | 1502-47-2 |
| melon | 32518-77-7 |

In the context of the present invention "compounds" is to be understood as meaning not only for example benzoguanamine itself and the adducts/salts thereof but also the nitrogen-substituted derivatives and the adducts/salts thereof.

Also suitable are ammonium polyphosphate $(NH_4PO_3)$, where n is about 200 to 1000, preferably 600 to 800, and tris(hydroxyethyl)isocyanurate (THEIC) of formula IV

IV

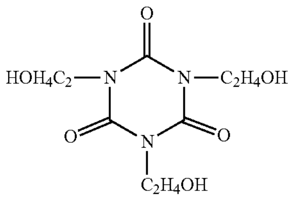

or the reaction products thereof with aromatic carboxylic acids $Ar(COOH)_m$ which may optionally be present in a mixture with one another, wherein Ar represents a monocyclic, bicyclic or tricyclic aromatic six-membered ring system and m is 2, 3 or 4.

Examples of suitable carboxylic acids include phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids, and anthracenecarboxylic acids.

Production is effected by reaction of the tris(hydroxyethyl)isocyanurate with the acids, the alkyl esters thereof or the halides thereof according to the processes in EP-A 584 567.

Such reaction products are a mixture of monomeric and oligomeric esters which may also be crosslinked. The degree of oligomerization is typically 2 to about 100, preferably 2 to 20. Preference is given to using mixtures of THEIC and/or reaction products thereof with phosphorus-containing nitrogen compounds, in particular $(NH_4PO_3)_n$ or melamine pyrophosphate or polymeric melamine phosphate. The mixing ratio for example of $(NH_4PO_3)_n$ to THEIC is preferably 90.0 to 50.0:10.0 to 50.0, in particular 80.0 to 50.0:50.0 to 20.0, wt % based on the mixture of such compounds.

Also suitable flame retardants are benzoguanidine compounds of formula V (V)

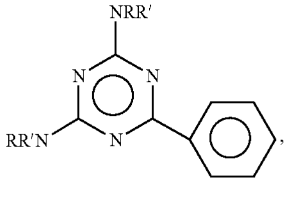

in which R, R' represents straight-chain or branched alkyl radicals having 1 to 10 carbon atoms, preferably hydrogen, and in particular adducts thereof with phosphoric acid, boric acid and/or pyrophosphoric acid.

Also preferred are allantoin compounds of formula VI, (VI)

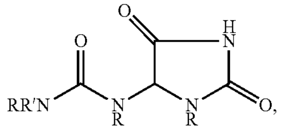

wherein R, R' are as defined in formula V, and also the salts thereof with phosphoric acid, boric acid and/or pyrophosphoric acid and also glycolurils of formula VII or the salts thereof with the abovementioned acids (VII)

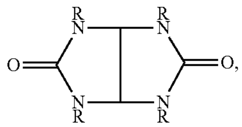

in which R is as defined in formula V.

Suitable products are commercially available or obtainable as per DE-A 196 14 424.

The cyanoguanidine (formula VIII) usable in accordance with the invention is obtainable for example by reacting calcium cyanamide with carbonic acid, the cyanamide produced dimerizing at from pH 9 to pH 10 to afford cyanoguanidine.

VIII

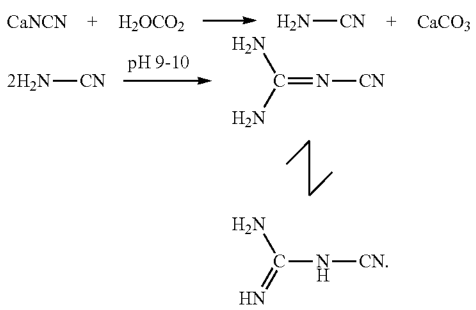

The commercially available product is a white powder having a melting point of 209° C. to 211° C.

It is particularly preferable to employ melamine cyanurate (for example Melapur® MC25 from BASF SE).

It is further possible to employ separate metal oxides such as antimony trioxide, antimony pentoxide, sodium antimonate and similar metal oxides. However it is preferable to eschew the use of such metal oxide since they are already present in component F. For a description of pentabromobenzyl acrylate and antimony trioxide or antimony pentoxide reference may be made to EP-A 0 624 626.

It is also possible to employ phosphorus, for example red phosphorus, as flame retardant. Red phosphorus may for example be employed in the form of a masterbatch.

Also contemplated are dicarboxylic acids of formula

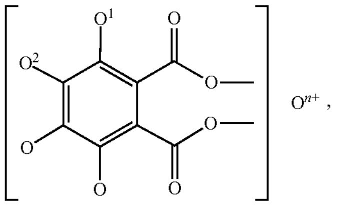

wherein $R^1$ to $R^4$ independently of one another represent halogen or hydrogen with the proviso that at least one radical $R^1$ to $R^4$ represents halogen, x=1 to 3, preferably 1, 2 m=1 to 9, preferably 1 to 3, 6, 9, in particular 1 to 3 n=2 to 3

M=alkaline earth metal, Ni, Ce, Fe, In, Ga, Al, Pb, Y, Zn, Hg.

Preferred dicarboxylic acid salts comprise as radicals $R^1$ to $R^4$ independently of one another Cl or bromine or hydrogen, especially preferably all radicals $R^1$ to $R^4$ are Cl or/and Br.

Be, Mg, Ca, Sr, Ba, Al, Zn, Fe are preferred as metals M.

Such dicarboxylic acid salts are commercially available or producible according to the processes described in U.S. Pat. No. 3,354,191.

Also employable as component F are functional polymers. These may be flame retardant polymers for example. Such polymers are described in U.S. Pat. No. 8,314,202 for example and comprise 1,2-bis[4-(2-hydroxyethoxy)phenyl] ethanone repeating units. A further suitable functional polymer for increasing the amount of carbon residue is poly(2, 6-dimethyl-1,4-phenyleneoxide) (PPPO).

The thermoplastic molding compositions of the invention can be produced by processes known per se, by mixing the starting components in conventional mixing apparatus, such as screw-based extruders, Brabender mixers, or Banbury mixers, and then extruding the same. After extrusion, the extrudate can be cooled and pelletized. It is also possible to premix individual components and then to add the remaining starting materials individually and/or likewise in the form of a mixture. The mixing temperatures are generally from 230 to 320° C.

These materials are suitable for the production of fibers, foils, and moldings of any type. Some examples follow: cylinder head covers, motorcycle covers, intake manifolds, charge-air-cooler caps, plug connectors, gearwheels, cooling-fan wheels, and cooling-water tanks.

In the electrical and electronic sector, improved-flow polyamides can be used to produce plugs, plug parts, plug connectors, membrane switches, printed circuit board modules, microelectronic components, coils, I/O plug connectors, plugs for printed circuit boards (PCBs), plugs for flexible printed circuits (FPCs), plugs for flexible integrated circuits (FFCs), high-speed plug connections, terminal strips, connector plugs, device connectors, cable-harness components, circuit mounts, circuit-mount components, three-dimensionally injection-molded circuit mounts, electrical connection elements, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also external bodywork components.

The combination of components B, C, and preferably D lead to an efficient system to stabilize polyamides at 180° C. and above, while maintaining a completely metal halide-free system.

In a preferred embodiment, the thermoplastic molding compositions are totally halide-free, so that they also do not contain halogen-containing flame retardants.

Especially the combination of a high molecular weight EVOH in combination with the specific high molecular weight phenol-based radical scavenger, and optionally a high molecular weight polyacid proved to be an efficient system to stabilize polyamides. The additives do not bloom out to the surface, even under moisture uptake or under electrical tension. Therefore, pollution and corrosion of electrical components can be avoided.

EXAMPLES

The following components were used:

PA1: Polyamide-6 having a viscosity number of 150 ml/g, measured on a 0.5% strength by weight solution in 96% strength by weight of sulfuric acid at 25° C. to ISO 307, melting point: 220° C. (Ultramid® B27 from BASF SE)

PA2: Polyamide-66 having a viscosity number of 150 ml/g, measured on a 0.5% strength by weight solution in 96% strength by weight of sulfuric acid at 25° C. to ISO 307, melting point: 260° C. (Ultramid® A27 from BASF SE)

PA3: Polyamide 66/6 having a viscosity number of 150 ml/g, measured on a 0.5% strength by weight solution in 96% strength by weight of sulfuric acid at 25° C. to ISO 307, melting point: 195° C. (Ultramid® $C_{27}$ from BASF SE)

GF: Standard E glass fiber, NEG E T249H

Lubricant: Ethylene bis stearamide (EBS) from Lonza Cologne GmbH

Stabilizer 1a: Cuprous iodide (CAS: 7681-65-4)

Stabilizer 1b: Potassium iodide (CAS: 7681-11-0)

Stabilizer 2: EVOH (ethylene vinyl alcohol copolymer; CAS: 25067-34-9) having an ethylene content of 20% to 50%

Stabilizer 3: Irganox® 1010 from BASF SE

Stabilizer 4: Trilon® P from BASF SE

Stabilizer 5: DPE (dipentaerythritol, CAS: 126-58-9)

Stabilizer 6: Iron powder (CAS: 7439-89-6)

Colorant: Solvent Black 7 (CAS: 8005-02-5)

Preparation of the Granules

The nature-colored polyamide granules were dried in a drying oven at 100° C. for 4 hours so that the humidity was below 0.1%. Afterwards, the molding compositions were prepared by melt compounding. The components were mixed in a twin-screw extruder having a diameter of 25 mm and a L/D ratio of 36. Processing conditions were set for 16 kg/h and 260 to 330° C., employing a flat temperature profile depending on the base resin. The obtained extrudates were cooled and granulated.

The granules obtained were used for injection-molding tensile bars or plaques, according to ISO 527-2 and Charpy sticks according to ISO 179-1. The molding temperature depending on the base resin was between 280 and 330° C. melt temperature and 80 to 120° C. mold temperature.

Compositions and mechanical data for inventive (INV) and comparative (COMP) examples are listed in below Tables 1 and 2.

Tensile modulus of elasticity, tensile stress at break and tensile strain at break are determined according to ISO 527. The Charpy (notched) impact strength is determined according to ISO 179-2/1eU and ISO 179-2/1eAf, respectively. Melting point and crystallization temperature are determined according to ISO 11357. All of the norms refer to the version valid in 2020.

Heat aging experiments were conducted in a standard laboratory oven at elevated temperatures and air as indicated in the tables below. Retention of tensile strength and elongation at break after heat aging in comparison with the value of the virgin specimens, the non-heat-aged control specimens were considered as being 100%.

Example COMP2 is based on US 2010/0028580 A. For Example COMP2, a migration of low molecular weight additive is reported in the literature (EP 2 896 656 A1). For Examples COM P1, INV1 and INV2, no migration was observed under test conditions. Migration or bleed-out of additives was tested by injection molding of 60×60×2 mm plaques at respective temperatures of 280° C./80° C. for PA6 and 290° C./80° C. for PA66. The resultant plaques where stored at 100° C. and 144 h in an oven at atmospheric pressure. Migration took place and in case of low molecular weight additives like DPE a white powder could be observed on the surface of the plaque.

The soot formation was determined visually after heat aging at the given conditions. For a more quantitative approach, the weight loss of a molded plaque of 60×60×2 mm and 60×60×1 mm dimension was determined with a balance before after accelerated heat aging at 200° C. and 1000 h.

TABLE 1

| | COMP1 | INV1 | INV2 | COMP2 |
|---|---|---|---|---|
| PA1 | 69.22 | 66 | 65.5 | 66.5 |
| GF | 30 | 30 | 30 | 30 |
| Lubricant | 0.2 | 0.2 | 0.2 | 0.2 |
| Stabilizer 1a | 0.06 | | | |
| Stabilizer 1b | 0.22 | | | |
| Colorant | 0.3 | 0.3 | 0.3 | 0.3 |
| Stabilizer 2 | | 3 | 3 | |
| Stabilizer 3 | | 0.5 | 0.5 | |
| Stabilizer 4 | | | 0.5 | |
| Stabilizer 5 | | | | 3 |
| Mechanical properties (dry), 23° C.: | | | | |
| Modulus of elasticity (ISO 527) [MPa] | 9357 | 9714 | 9687 | 9540 |
| Tensile strength (ISO 527) [MPa] | 173 | 171 | 175 | 175 |
| Elongation at break (ISO 527) [%] | 3.9 | 4.0 | 4.0 | 3.4 |
| Impact strength (ISO 179/1eU) [kJ/m$^2$] | 96 | 98 | 101 | 72 |
| Notched impact strength | 12.8 | 12.6 | 13.7 | 10.8 |
| Aging 150° C.: | | | | |
| Tensile strength (2000 h) [MPa] | 159 | 183 | 186 | 177 |
| Tensile strength (3000 h) [MPa] | 150 | 178 | 183 | N.N. |
| Retention of tensile strength after 3000 h [%] | 87 | 104 | 104 | N.N. |
| Elongation at break (2000 h) [%] | 2.0 | 2.9 | 3.,1 | 2.3 |
| Elongation at break (3000 h) [%] | 1.8 | 2.6 | 2.8 | N.N. |

TABLE 1-continued

| | COMP1 | INV1 | INV2 | COMP2 |
|---|---|---|---|---|
| Retention of elongation at break after 3000 h [%] | 46 | 65 | 70 | N.N. |
| Sooting (visual) | high | low | low | low |
| Aging 180° C.: | | | | |
| Tensile strength (2000 h) [MPa] | 146 | 172 | 179 | 191 |
| Tensile strength (3000 h) [MPa] | 141 | 165 | 168 | N.N |
| Retention of tensile strength after 3000 h [%] | 81 | 97 | 96 | N.N. |
| Elongation at break (2000 h) [%] | 1.7 | 2.2 | 2.4 | 2.5 |
| Elongation at break (3000 h) [%] | 1.6 | 2.1 | 2.1 | N.N. |
| Retention of elongation at break after 3000 h [%] | 40.8 | 52.5 | 52.5 | N.N. |
| Sooting (visual) | high | medium | medium | medium |
| Weight loss after aging at 200° C./1000 h: | | | | |
| 1 mm [%] | 9 | 8 | 6 | N.N. |
| 2 mm [%] | 5 | 5 | 4 | N.N. |

TABLE 2

| | COMP3 | INV3 | INV4 | INV5 |
|---|---|---|---|---|
| PA2 | 54.2 | 51 | 50.5 | 50.3 |
| PA3 | 15 | 15 | 15 | 15 |
| GF | 30 | 30 | 30 | 30 |
| Lubricant | 0.2 | 0.2 | 0.2 | 0.2 |
| Stabilizer 1a | 0.075 | | | |
| Stabilizer 1b | 0.225 | | | |
| Colorant | 0.3 | 0.3 | 0.3 | 0.3 |
| Stabilizer 2 | | 3 | 3 | 3 |
| Stabilizer 3 | | 0.5 | 0.5 | 0.5 |
| Stabilizer 6 | | | | |
| Stabilizer 4 | | | 0.5 | 0.5 |
| Stabilizer 6 | | | | 0.25 |
| Mechanical properties (dry), 23° C.: | | | | |
| Modulus of elasticity (ISO 527) [MPa] | 9786 | 9912 | 9984 | 9967 |
| Tensile strength (ISO 527) [MPa] | 182 | 179 | 185 | 182 |
| Elongation at break (ISO 527) [%] | 3.7 | 3.74 | 3.75 | 3.5 |
| Impact strength (ISO 179/1eU) [kJ/m$^2$] | 87 | 95 | 94 | 86 |
| Notched impact strength | 9.48 | 9.85 | 10.5 | 9.37 |
| Aging 190° C.: | | | | |
| Tensile strength (2000 h) [MPa] | 139 | 148 | 163 | 172 |
| Retention of tensile strength after 2000 h [%] | 77 | 83 | 88 | 95 |
| Elongation at break (2000 h) [MPa] | 1.6 | 1.7 | 1.94 | 2.19 |
| Retention of elongation at break after 2000 h [%] | 42 | 46 | 52 | 63 |

The above examples illustrate that by employing stabilizer 2 (a polyhydric alcohol according to component B) and stabilizer 3 (a sterically hindered phenol antioxidant according to component C) polyamide molding compositions can be obtained which show a high retention of tensile strength and elongation at break after prolonged heat treatment. The heat aging resistance of the polyamide molding compositions can be further increased by additionally employing stabilizer 4 which is a polycarboxylic compound of component D, see Examples INV2, INV4 and INV5.

The invention claimed is:

1. A thermoplastic molding composition, comprising a) 30 to 99.85 wt % of at least one thermoplastic polyamide as component A;

b) 0.1 to 10 wt % of at least one polyhydric alcohol having more than 6 hydroxyl groups, and having a number average molecular weight $M_n$ of more than 2000 g/mol as component B;

c) 0.05 to 3 wt % of at least one sterically hindered phenol antioxidant as component C;

d) 0.01 to 3 wt % of at least one polycarboxylic compound having more than 3 carboxylic acid groups and/or carboxylate groups, based on polyethylenimine which is N-substituted by acetic acid or acetate groups, and having a number average molecular weight $M_n$ of more than 300 g/mol as component D;

e) 0 to 50 wt % of at least one fibrous and/or particulate filler as component E; and f) 0 to 25 wt % of further additives as component F;

wherein the total of wt % of components A to F is 100 wt %.

2. The thermoplastic molding composition according to claim 1, wherein component B has more than 8 hydroxyl groups.

3. The thermoplastic molding composition according to claim 1, wherein component B has a number average molecular weight $M_n$ of more than 3000 g/mol.

4. The thermoplastic molding composition according to claim 1, wherein component B is an ethylene-vinyl alcohol copolymer having a content of 10 to 60 mol % of ethylene units.

5. The thermoplastic molding composition according to claim 1, wherein component C has a molecular weight of more than 500 g/mol.

6. The thermoplastic molding composition according to claim 1, wherein component D has a number average molecular weight $M_n$ of more than 500 g/mol.

7. The thermoplastic molding composition according to claim 1, wherein component C has at least one phenol group substituted by at least one branched $C_{3-12}$-alkyl group.

8. The thermoplastic molding composition according to claim 1, wherein component D is present in an amount of from 0.1 to 2 wt %.

9. The thermoplastic molding composition according to claim 1, wherein component E comprises glass fibers, and is present in an amount of from 10 to 50 wt %.

10. A process for preparing the thermoplastic molding composition according to claim 1 by mixing the components A to F.

11. A method of using the thermoplastic molding composition according to claim 1 for producing fibers, foils, and moldings of any type.

12. A fiber, foil or molding, made of the thermoplastic molding composition according to claim 1.

13. The thermoplastic molding composition according to claim 1, wherein component B has more than 10 hydroxyl groups.

14. The thermoplastic molding composition according to claim 1, wherein component B has a number average molecular weight $M_n$ of more than 5000 g/mol.

15. The thermoplastic molding composition according to claim 1, wherein component C has a molecular weight of more than 1000 g/mol.

16. The thermoplastic molding composition according to claim 1, wherein component D has a number average molecular weight $M_n$ of more than 1000 g/mol.

* * * * *